2 Sheets—Sheet 1.

C. G. CASE.
Thrashing-Machine.

No. 226,973. Patented April 27, 1880.

WITNESSES
E. I. Nottingham
F. O. McCleary

INVENTOR
C. G. Case.
By H. A. Seymour,
ATTORNEY

N. PETERS, PHOTO-LITHOGRAPHER, WASHINGTON, D. C.

2 Sheets—Sheet 2.
C. G. CASE.
Thrashing-Machine.
No. 226,973. Patented April 27, 1880.
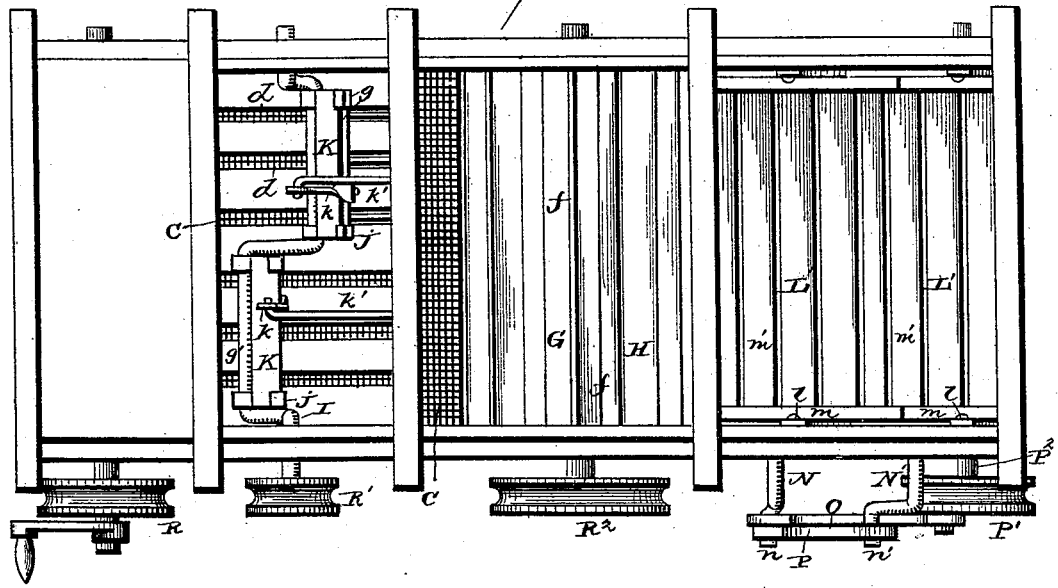
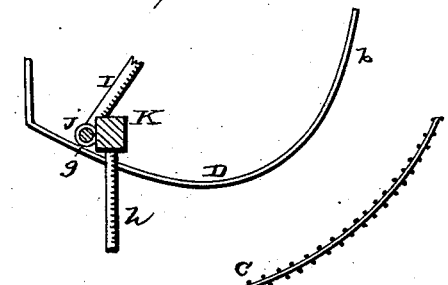
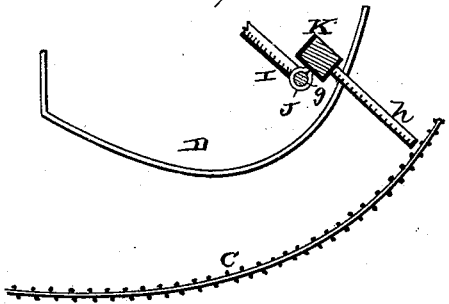
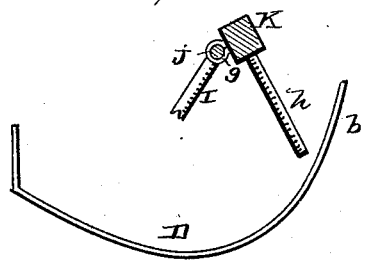
WITNESSES
E. Nottingham
F. O. McCleary
INVENTOR
C. G. Case
By H. A. Seymour
ATTORNEY

UNITED STATES PATENT OFFICE.

CONSTANTIUS G. CASE, OF BATTLE CREEK, MICHIGAN.

THRASHING-MACHINE.

SPECIFICATION forming part of Letters Patent No. 226,973, dated April 27, 1880.

Application filed December 16, 1879.

*To all whom it may concern:*

Be it known that I, CONSTANTIUS G. CASE, of Battle Creek, in the county of Calhoun and State of Michigan, have invented certain new and useful Improvements in Thrashing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in thrashing-machines.

The object of the invention is to provide a thrashing-machine of such construction and relative arrangement of parts that the straw shall be prevented from winding around the thrashing-cylinder, and shall be thoroughly agitated and picked apart in order to effect the separation of the greater portion of the grain therefrom before it is transferred to the reciprocating shakers; and, further, to deliver the straw in its separated and loosened condition upon a rotary straw-carrying drum provided with blades or ribs on its periphery, to raise the straw to a proper height for delivery to the shakers and allow a portion of the grain that is intermixed with the straw to fall into the grain pockets or receptacles in the periphery of the drum and thereby be separated from the straw; and, further, to deliver the loosened straw from the rotary straw-carrying drum onto a series of reciprocating slotted shakers, the adjacent sections of which are constructed and arranged to be reciprocated simultaneously in opposite directions, and thereby pull the straw apart, dislodging the grain therefrom, and allow the grain to fall through between the slats of the shakers.

To these ends my invention consists in the several details in construction and combinations of parts, as will hereinafter be described, and pointed out in the claims.

Figure 1:
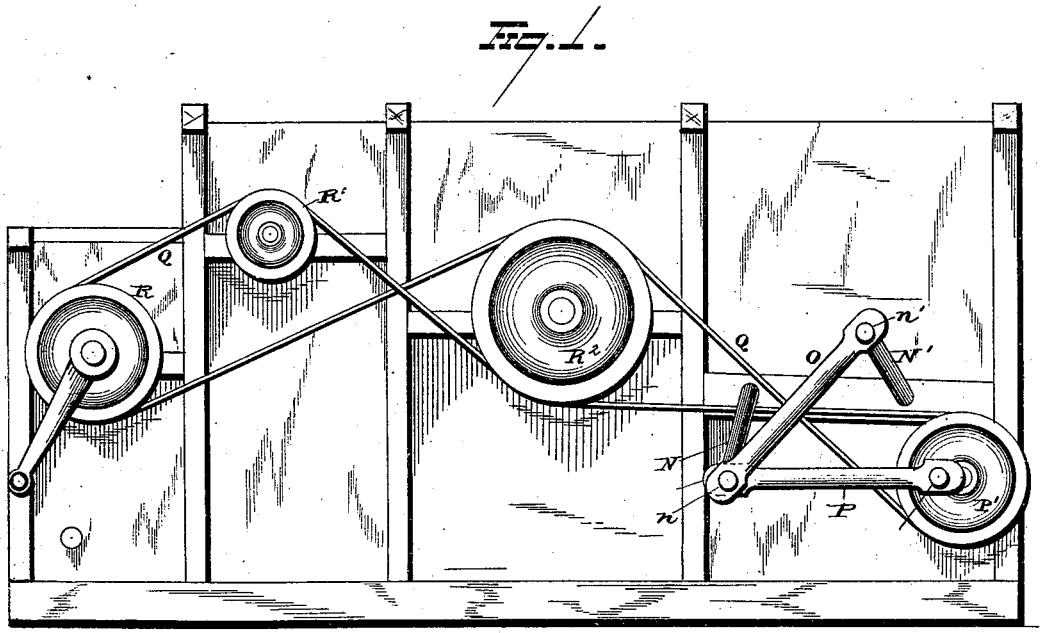
Figure 2:
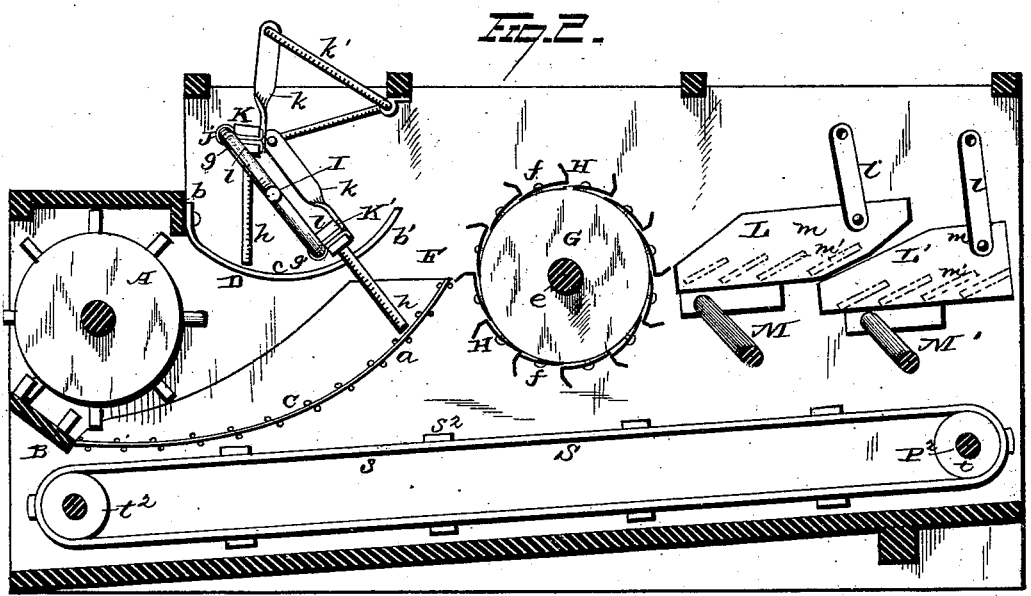

In the accompanying drawings, Figure 1 is a side elevation of my improved thrashing-machine. Fig. 2 is a similar view with the side of the machine removed to show the interior thereof. Fig. 3 is a plan view. Figs. 4, 5, and 6 are detached views, showing the movement of the agitators.

A represents the thrashing-cylinder, and B the concave, which parts may be of any approved construction. To the rear edge of concave B is attached one end of a grate, C, which latter extends rearwardly in nearly a horizontal plane, or may be slightly curved, while its opposite or rear end is upwardly curved, as at $a$. To the cylinder-box $b$ is attached the forward end of a guard, D, the latter being practically straight for the greater portion of its length, and terminating at its rear end in an upward curve, as at $b'$.

It will thus be observed that a conduit, E, is formed by the grate C on the lower side and guard D on the upper side, said conduit leading rearwardly from the thrashing-cylinder, and terminating in an upwardly-curved exit, F. The guard D is composed of independent strips $c$, of metal or wood, which are separated to form intervening slots or openings $d$, for a purpose hereinafter explained.

G is a revolving straw-carrying drum, and is attached to shaft $e$. The periphery of the drum is provided with the longitudinal blades H, each blade being made of any desired width, and thereby constituting grain-receptacles $f$ between said blades. The outer edges of the blades may be made either straight, notched, or corrugated, as desired.

The rear end of the grate C is located in close proximity to the periphery of the drum G and preferably at about its horizontal center. Thus the exit F of the straw-conduit E is formed in such relation to the drum G that the straw will be deposited upon the upper portion of the drum and carried rearwardly.

I is a double-crank shaft, the ends of which are journaled in the sides of the machine, said crank-shaft being located over the guard D. To the cranks $g$ $g'$ are hinged the agitators K K', which latter are provided with fingers $h$, attached to a cross-head, $i$, the latter being hinged to or journaled upon the cranks $g$ $g'$ by means of the loops or straps $j$, or connected therewith in any other manner desired. To the cross-heads $i$ are secured the lower ends of the bars or rods $k$, their upper ends being hinged or pivoted to the outer ends of the pivoted or swinging link-rods $k$ $k'$. The operation of the agitators will be clearly understood by reference to Figs. 4, 5, and 6.

In Fig. 4 the agitator K is represented as having moved downwardly in nearly a vertical plane in close proximity to the periphery of the thrashing-cylinder, at which point the teeth or fingers $h$ engage with the straw. The fingers $h$ then move rearwardly, describing a curve, and operate to lift the straw and deposit it on the straw-carrying drum, as illustrated in Fig. 5. The fingers are then caused to recede from the straw and pass through the upwardly-curved end of the slotted guard, as shown in Fig. 6, and then pass over the guard to its forward end, when they again descend and engage with the straw. The guard D serves to prevent the straw from winding around on the thrashing-cylinder and to guide the straw toward the revolving drum, while its rear and upwardly-curved end operates to guide the straw to the proper point of delivery, and also to disengage the straw from the fingers of the agitators.

I have described the operation of a single agitator, the other one operating in the same manner, but not at the same time, the cranks being arranged so that the agitators shall operate successively.

While the agitators serve to pull the straw from the thrashing-cylinder and transfer it to the rotary straw-carrying drum, they also serve to pull the straw apart and loosen it, so that a greater portion of the grain intermixed therewith will be dislodged or disengaged and allowed to drop through the grate.

The revolving drum is provided with blades or ribs, which engage with the straw and carry it rearward, while the spaces between the ribs constitute grain-receptacles, into which the grain may fall as it becomes disengaged from the straw and be separated from the same and allowed to fall on a grain board or carrier.

L L' are the slotted shakers, the rear end of each shaker being supported by suspension links or rods $l$, the upper ends of which are pivoted to the sides of the machine, and their lower ends pivoted to the sides $m$ of the shakers. The forward ends of shakers L L' are each supported upon the crank-shafts M M', the outer ends of which are provided with crank-arms N N' and wrist-pins $n$ $n'$, the latter being connected by a connecting-rod, O. To the wrist-pin $n$ is journaled one end of a pitman, P, the opposite end of which is attached to wrist-pin $p$, attached to the driving-pulley P', secured to the outer end of shaft P$^2$. Shakers L L' are each composed of the side pieces, $m$, and inclined slats $m'$. When rotary movement is imparted to the wheel P' the shakers are oscillated simultaneously in opposite directions. The adjacent ends of the side pieces of the shakers L L' are beveled, so that the rear end of shaker L may overlap the forward end of shaker L', and as movement is imparted to these shakers they will travel forward and backward in a slightly-curved path, and thus feed the straw rearwardly, and at the same time pull the straw apart and allow any grain remaining in the straw to become disengaged and drop through the openings between the inclined slats of the shakers.

The agitators, rotary drum, and shakers are operated by means of a belt or chain, Q, which passes around a pulley, R, attached to the end of the shaft of the thrashing-cylinder, then over a small pulley, R', attached to the crank-shaft to which the agitators are connected, then over pulley R$^2$, secured to the shaft of the rotary drum, and then around the pulley P'. If a chain is employed the pulleys will be supplanted by suitable sprocket-wheels.

S is an endless grain-conveyer, consisting of the belts $s$, having independent slats $s^2$ secured to them, the slats being placed sufficiently close to prevent the grain from falling through between them. If desired, the adjacent edges of the slats may be rabbeted, so that the slats will overlap each other. One end of the endless conveyer passes around the pulleys $t$, secured to the shaft P$^2$, located at the rear end of the machine, while the other end passes around the pulleys $t^2$, secured to a shaft, T, journaled in the forward end of the machine, and thus the grain, as it falls through the grate and shakers and from the receptacles in the rotary drum, is carried and delivered at the rear of the machine.

It is evident that many slight changes might be made in details of construction and arrangements of parts without departing from the spirit of my invention—as, for instance, the rotary straw-carrying drum might be dispensed with, and my improvement in the agitators and guard applied to an ordinary thrashing-machine to deliver the straw onto shakers of any approved construction. Further, any approved cleaner may be used, and also any approved means may be resorted to for carrying the grain and chaff to the cleaners.

While I have described my invention as an improvement in thrashing-machines, it will be understood that it may be employed in connection with clover-hullers with good results. Hence I would have it understood that I do not limit myself to the exact construction and arrangement of parts shown and described; but, Having fully described my invention, what I claim as new, and desire to secure by Letters Patent, is—

1. The combination, with a thrashing or hulling cylinder and a curved grate extending rearwardly and upwardly from the thrashing or hulling concave to a straw-carrier, of a combined stationary slotted guard and deflector, located in rear of said cylinder and curved upwardly to constitute, in connection with the grate, a straw-conduit from the cylinder to a straw-carrier, and one or more agitators connected with a crank-shaft located over said slotted guard, said agitators constructed and adapted to pull the straw from the thrashing or hulling cylinder and carry it rearward and upward to a suitable straw carrier or shaker, substantially as set forth.

2. The combination, with a thrashing or hulling cylinder and a rotary straw-carrying drum, of a grate extending from the concave to the rotary drum, a stationary slotted guard located above the grate and forming an intervening straw-conduit, and agitating mechanism, substantially as described, operating through said guard, the rear ends of said grate and guard being upwardly curved to conduct the straw onto the upper portion of said drum, substantially as set forth.

3. The combination, with a thrashing or hulling cylinder and a rotary straw-carrying drum or cylinder, of a curved grate extending from the concave rearward to the rotary drum, and a curved slotted guard located above the grate and extending from the cylinder rearward and forming an exit-opening between its rear end and rotary drum, and agitators attached to a crank-shaft placed above said guard and arranged and adapted to transfer the straw from the cylinder to and upon the rotary straw-carrying drum, substantially as and for the purpose set forth.

4. In a thrashing-machine, the combination, with the shakers L L', (two or more,) the adjacent shakers adapted to be reciprocated in opposite directions, of the crank-shafts M M', relatively arranged as set forth, connecting-rod O, and pitman P, substantially as set forth.

In testimony that I claim the foregoing I have hereunto set my hand this 6th day of December, 1879.

CONSTANTIUS G. CASE.

Witnesses:
A. C. KINGMAN,
M. G. BEACH.